United States Patent
Bruno et al.

(10) Patent No.: US 11,033,857 B2
(45) Date of Patent: Jun. 15, 2021

(54) CROSS-FLOW HEAT EXCHANGER

(71) Applicant: SAIPEM S.P.A., Milan (IT)

(72) Inventors: Lorenzo Bruno, Milan (IT); Rosario Galati, Milan (IT); Lino Carlessi, Milan (IT)

(73) Assignee: SAIPEM S.P.A., Milan (IT)

(*) Notice: Subject to any disclaimer, the term of this patent is extended or adjusted under 35 U.S.C. 154(b) by 0 days.

(21) Appl. No.: 16/337,613

(22) PCT Filed: Sep. 19, 2017

(86) PCT No.: PCT/IB2017/055666
§ 371 (c)(1),
(2) Date: Mar. 28, 2019

(87) PCT Pub. No.: WO2018/060810
PCT Pub. Date: Apr. 5, 2018

(65) Prior Publication Data
US 2020/0030743 A1    Jan. 30, 2020

(30) Foreign Application Priority Data

Sep. 28, 2016  (IT) .................... 102016000097320

(51) Int. Cl.
*B01D 53/34* (2006.01)
*B01D 53/00* (2006.01)
(Continued)

(52) U.S. Cl.
CPC ......... *B01D 53/343* (2013.01); *B01D 53/002* (2013.01); *B01D 53/8609* (2013.01);
(Continued)

(58) Field of Classification Search
None
See application file for complete search history.

(56) References Cited

U.S. PATENT DOCUMENTS

2015/0260464 A1* 9/2015 Cole ................... F28D 9/005
165/185
2016/0054071 A1  2/2016 Cordova et al.

FOREIGN PATENT DOCUMENTS

CN          104697377 A       6/2015
DE   11 2012 002 793 T5      3/2014
(Continued)

OTHER PUBLICATIONS

Tadashi, T. JP2001-317885A-translated document (Year: 2001).*
(Continued)

*Primary Examiner* — Jelitza M Perez
(74) *Attorney, Agent, or Firm* — Merchant & Gould P.C.

(57) ABSTRACT

A counter-current cross-flow heat exchanger for heating a first gas and cooling a second gas, includes modules in fluid communication with one another, each module being positioned on a plane, the planes mutually overlapping. Conduits allow entry and exit of the first and second gases into and out of the exchanger. Each module has heat exchange plates, with heating and cooling faces. The plates are orthogonal to the module plane and parallel to define alternating heating and cooling spaces. The first gas crosses each heating space with a direction substantially parallel to the plane of each module and the second gas crosses each cooling space with a direction substantially orthogonal to the plane of each module. The cooling spaces between adjacent modules are in direct fluid communication. The heating spaces between adjacent modules are in fluid communication with one another by conduits/conveyors, creating a serpentine path.

12 Claims, 12 Drawing Sheets

(51) Int. Cl.
     *B01D 53/86*      (2006.01)
     *F28D 9/00*      (2006.01)
     *F28D 21/00*      (2006.01)
     *F28F 9/26*      (2006.01)
     *F28F 27/02*      (2006.01)

(52) U.S. Cl.
     CPC ....... *B01D 53/869* (2013.01); *B01D 53/8625* (2013.01); *F28D 9/0093* (2013.01); *F28D 21/001* (2013.01); *F28F 9/26* (2013.01); *F28F 27/02* (2013.01); *F28F 2250/06* (2013.01); *F28F 2250/106* (2013.01); *F28F 2250/108* (2013.01)

(56) References Cited

FOREIGN PATENT DOCUMENTS

| | | | |
|---|---|---|---|
| JP | 2001-317885 A | 11/2001 | |
| JP | 2001317885 A * | 11/2001 | ........... F28D 21/001 |

OTHER PUBLICATIONS

International Search Report and Written Opinion of the International Searching Authority for International Patent Application No. PCT/IB2017/055666 dated Dec. 11, 2017, 8 pages.

* cited by examiner

CROSS-FLOW HEAT EXCHANGER

This application is a National Stage Application of PCT/IB2017/055666, filed 19 Sep. 2017, which claims the benefit of Serial No. 102016000097320, filed 28 Sep. 2016 in Italy, and which applications are incorporated herein by reference. To the extent appropriate, a claim of priority is made to each of the above-disclosed applications. CL TECHNICAL FIELD OF THE INVENTION The present invention relates to the field of gas purification in order to reduce the emission of pollutants into the environment.

BACKGROUND ART

A refinery is a highly complex system, where the systems for the treatment of heavy crude oils are placed for the production of hydrocarbons and important sub-products for the petrochemical industry, as well as several structures which provide auxiliary services.

In particular, waste water treatment systems, thermoelectric plant, a system for the purification of the flue gases emitted by the boilers (SNOX/WSA) and a system for the production of liquid sulfur starting from hydrogen sulphide (Claus system) can be mentioned.

Among them, the SNOX/WSA system is used to remove the sulfur dioxide contained in the flue gases originating from boilers or from off-gases originating from the processes of combustion of hydrogen sulphide, from FCC (Fluid Catalytic Cracking), from the incineration of exhausted hydrogen sulphide, etc.

The system essentially comprises a reaction section, a gas cooling section and a condensing section, as diagrammatically shown in FIG. 1.

1) Reaction Section

In this section, sulfur dioxide reacts catalytically with oxygen to produce sulfur trioxide. The reaction, conducted at about 400° C., is as follows:

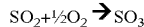

$$SO_2 + \tfrac{1}{2}O_2 \rightarrow SO_3$$

A reactor for the removal of NOx may be associated with the reactor.

2) Cooling Section

The gases originating from the catalytic reaction section are cooled down to a temperature of about 260° C. Part of the sulfur trioxide is combined with water vapor producing sulfuric acid in vapor phase, as indicated below:

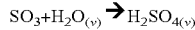

$$SO_3 + H_2O_{(v)} \rightarrow H_2SO_{4(v)}$$

3) Condensing Section

Within a glass tube heat exchanger, the gas is cooled with air, thus completing the condensation of sulfuric acid:

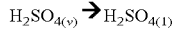

$$H_2SO_{4(v)} \rightarrow H_2SO_{4(l)}$$

Once cooled, the sulfuric acid thus condensed is stored to be then utilized as a sub-product.

Between the reaction and the condensing sections of a SNOX/WSA system is inserted a GGHE (Gas-Gas Heat Exchanger, also abbreviated as GGH), which serves the purpose of heating the flue gases containing $SO_2$ cooling the flue gases rich in sulfur trioxide exiting the reaction zone.

Known gas-gas heat exchangers utilized in the SNOX/WSA systems have large dimensions and are able to accommodate flow rates of as much as 1 $MNm^3$/hour, reach duty values of about 50 Gcal/hour and have an exchange surface area of up to 100,000 $m^2$.

In the first SNOX systems with high flow rate (900,000-1,200,000 $Nm^3$/hour), Ljungström gas-gas heat exchangers were used.

This type of exchangers consists of a rotating cylinder within which corrugated metal sheets form partitions.

In each sector pass, at successive times, the two fluids (hot and cold).

These exchangers are characterized by a low investment cost and by ease of cleaning and washing, as well as by the possibility of easily replacing the corroded parts due to the division of the surface in removable filling baskets.

However, the very construction and operation of a Ljungstrom heat exchanger results in the drawback of a partial mixing between the two gases; only with particular measure can the so-called "blow-by" be reduced from 5% to 2%.

The performance of the SNOX system is thus affected, considerably reducing the removal of sulfur dioxide from 98% to 94%.

The prior art document JP 2001317885 A describes an exchanger for cooling flue gases originating from an incinerator and heating air, which operates with LMTD of about 100-150° C.

Document US 2016/054071 describes a particular configuration of a heat exchanger to maximize heat transfer and minimize pressure loss; for example, helical paths for fluids are suggested.

Hence, it is apparent that there is a need to develop a heat exchanger for gases which can be employed in a SNOX/WSA system without reducing its performance.

OBJECT OF THE INVENTION

It is a first object of the present invention to provide a cross-flow heat exchanger.

In accordance with a further object, a method for carrying out a heat exchange between two gaseous fluids by using said exchanger is described.

According to a further object, the present invention describes a SNOX/WSA system which comprises a cross-flow heat exchanger.

Further objects of the invention are represented by particular aspects of the exchanger and of the system described herein.

DETAILED DESCRIPTION OF THE INVENTION

According to a first object, the present invention describes a counter-current cross-flow heat exchanger.

The term "cross-flow" shall be understood to be referred to the path of the two exchange fluids, moving with directions which are mutually inclined, and preferably perpendicular.

As shall be described below, according to the present invention each of the two fluids between which the heat exchange is achieved moves along a path comprising portions which are perpendicular to the direction of the other fluid.

The term "counter-current", instead, means that the two fluids move overall following opposite directions.

For the purposes of the present invention, the two fluids are in gaseous phase and therefore the reference shall be to a cross-flow gas-gas heat exchanger (GGHE or GGH).

In particular, a first gas is represented by a gas rich in sulfur dioxide ($SO_2$), for example contained in the fume gases from boilers.

For the present purposes, said gas is the gas to be heated (for simplicity, reference shall be made thereto as sulfur dioxide or $SO_2$ or "first gas").

Concerning the second gas, it is a gas rich in sulfur trioxide ($SO_3$, which is produced in a catalytic reaction section of a SNOW/WSA system, for example.

For the present purposes, said gas is the gas to be cooled (for simplicity, reference shall be made thereto as sulfur trioxide or $SO_3$ or "second gas").

The exchanger of the invention, in particular, is of the plate type.

Figure 2:
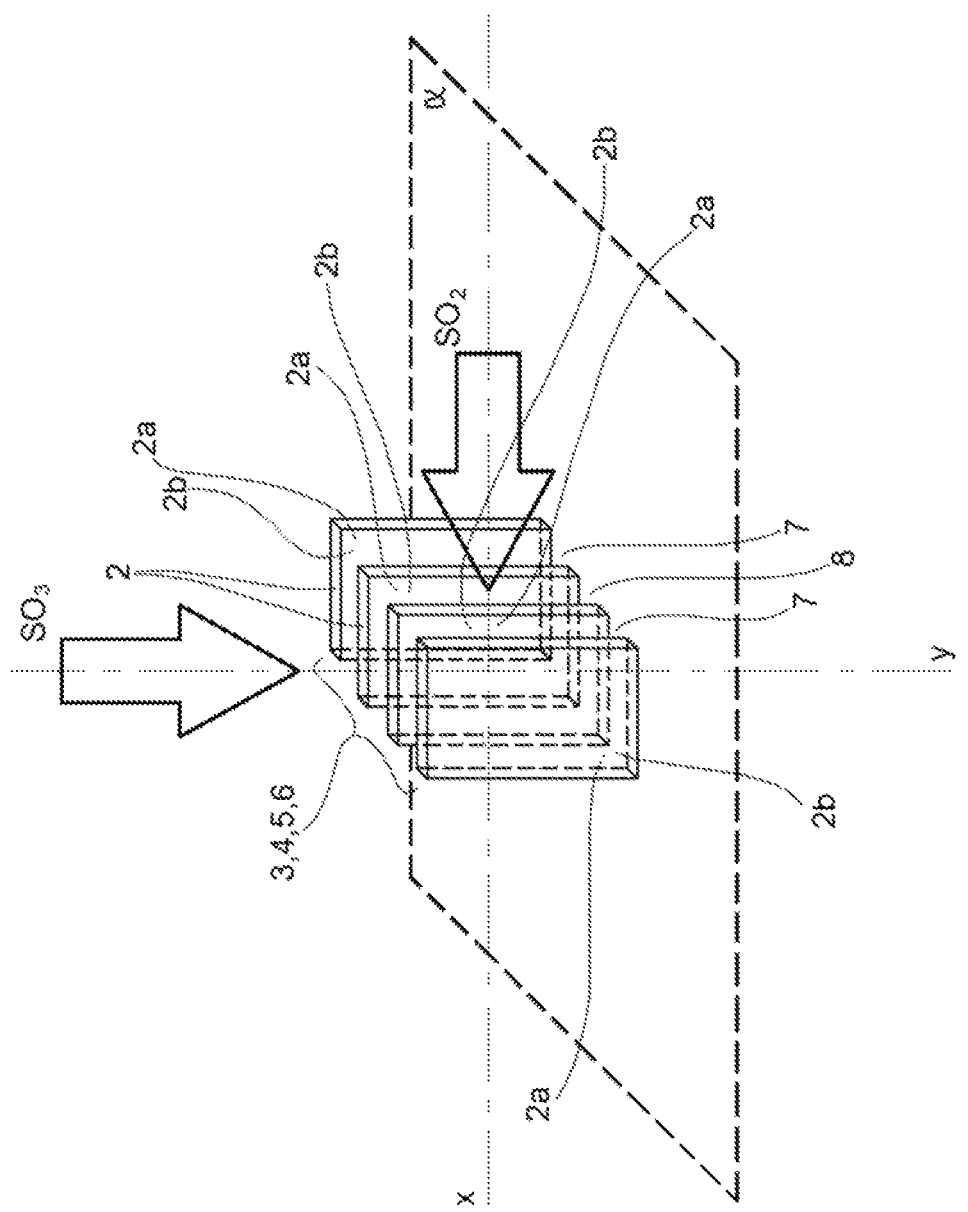
FIG. 2 shows the path of the two flows within one of the modules of the exchanger of the invention.
Figure 3:
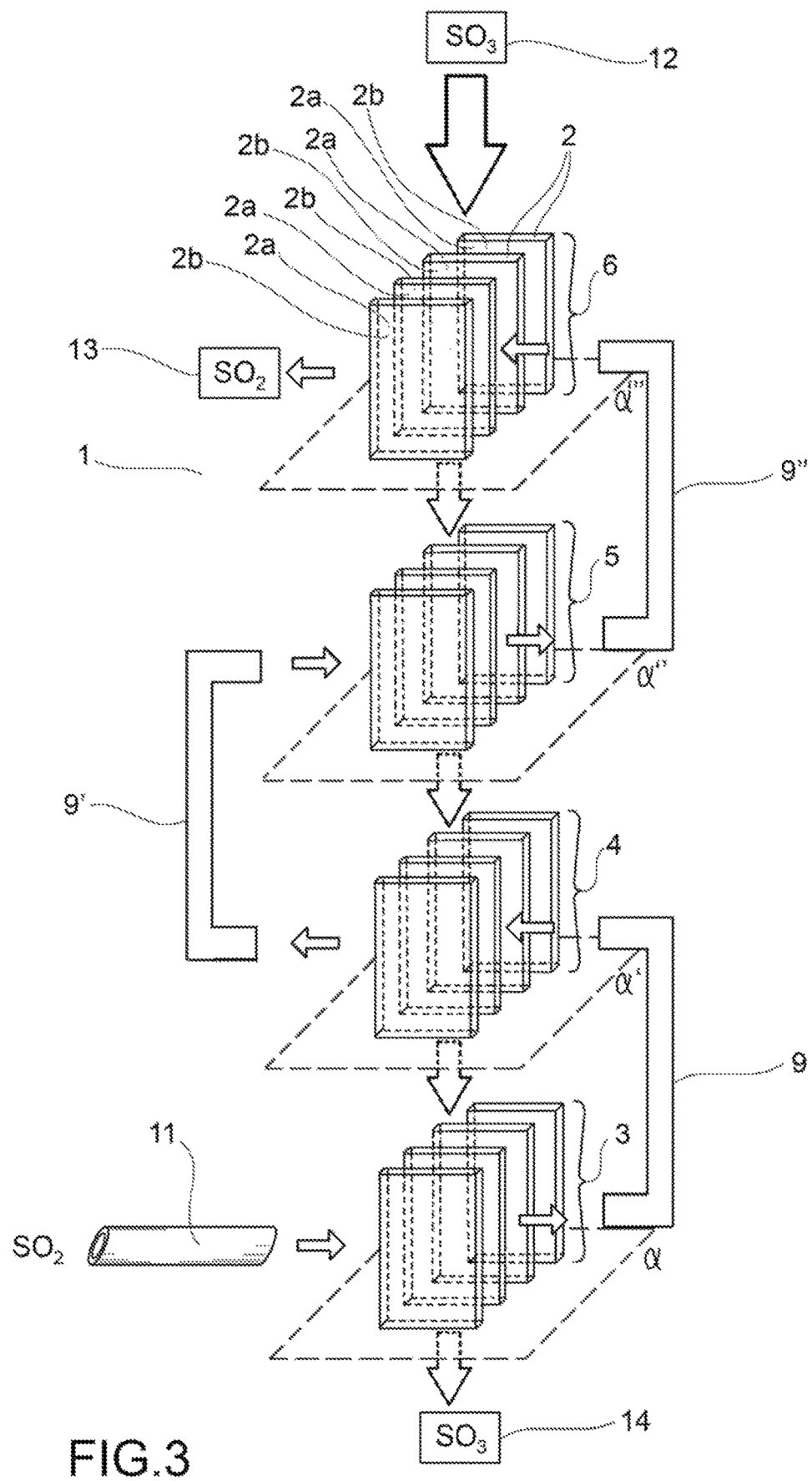
FIG. 3 shows a diagram of the paths of the two flows within the exchanger of the invention.

In more detail, as shown in FIGS. 2 and 3, a plurality of plates 2 is organized in modules (or banks) 3,4,5,6, within which the plates 2 are arranged orthogonally or sub-orthogonally relative to a plane of the module $\alpha,\alpha',\alpha'',\alpha'''$ with mutually parallel faces.

In particular, in each plate 2 are recognized a first heating face (or surface) 2a and a second cooling face (or surface) 2b.

The plates 2 are arranged in each module 3,4,5,6 so that the heating faces 2a of two side-by-side plates are mutually opposite, thus delimiting a heating space 7.

Similarly, the two cooling faces 2b of two side-by-side plates delimit a cooling space 8 therebetween.

The heating spaces 7 and the cooling spaces 8, then, are alternating relative to one another.

Advantageously, the heating spaces 7 and the cooling spaces 8 within each module are insulated so that there is no mixing between the two gases or their dispersion in the atmosphere, for example sealed by appropriate welds (not shown) (fully welded plate heat exchanger).

Within each module 3,4,5,6 the sulfur dioxide crosses the heating spaces 7 horizontally according to a direction x, while the sulfur trioxide crosses the cooling spaces 8 vertically from the top towards the bottom, according to a direction y, perpendicular to the direction x.

For the purposes of the present invention, then, the flow of sulfur dioxide crosses the heating spaces 7 of each module 3,4,5,6 following a horizontal or sub-horizontal direction (direction x), substantially parallel to the plane $\alpha,\alpha',\alpha'',\alpha'''$; sulfur trioxide, instead, crosses the cooling spaces 8 following a vertical or sub-vertical direction (direction y), substantially orthogonal to the planes $\alpha,\alpha',\alpha'',\alpha'''$.

Within each module, therefore, the flows of the two gases have mutually perpendicular paths.

The exchanger 1 of the invention comprises in particular a plurality of modules 3,4,5,6 (or banks), preferably three or four, positioned on mutually overlapping planes $\alpha,\alpha',\alpha'',\alpha'''$; advantageously, then, the exchanger 1 has a vertical development overall (see FIG. 3).

In order to ensure their operation, the modules 3,4,5,6 of the exchanger are in fluid communication with one another.

In particular, the cooling spaces 8 of the modules 3,4,5,6 are in direct fluid connection with one another; i.e., the sulfur trioxide passes directly from one module to the next one (underlying/on the lower plane) due to the correspondence between the respective cooling spaces 8 of the modules.

On the contrary, the fluid communication between the heating spaces 7 is indirect; for this purpose, the exchanger 1 comprises conveyors 9,9',9'' (which can also be in the form of conduits) capable of collecting the flow of $SO_2$ exiting one module and sending it to the next module (upper/on the upper plane).

Overall, therefore, the flow of the sulfur trioxide follows a vertical path downwards (i.e. from the plane $\alpha'''$ to the plane $\alpha$), while the flow of the sulfur dioxide follows a "serpentine" paths from the bottom towards the top (i.e. from plane $\alpha$ to plane $\alpha'''$), as depicted in FIG. 3, thus achieving an overall counter-current heat exchange between the two fluids.

For the purposes of the present invention, a "serpentine" path shall be understood to be a path comprising horizontal segments alternating with vertical segments in which, preferably, the successive horizontal segments are on parallel and overlapping planes.

The exchanger 1 further comprises conduits for the entry of the gases to be heated 11 and to be cooled 12 and conduits for the exit of the heated gases 13 and of the cooled gases 14.

For convenience of explanation, reference is made herein to the first heating module 3 as the module situated farthest down in the exchanger 1 (corresponding to the last module for cooling the sulfur trioxide) above which are positioned the second 4, the third 5 and possibly the fourth module 6; the last heating module, situated higher, thus corresponds to the first cooling module, and vice versa.

According to a particular embodiment of the exchanger 1 of the invention, at the conduit for the entry of the sulfur dioxide 11 into the exchanger 1, a system is provided, capable of reducing the flow of sulfur dioxide to the first heating module 3 and/or deflecting at least one portion of that flow to a subsequent (higher) module, e.g. to the second 4, third 5 or fourth 6 heating module.

Preferably, the deflection is towards the third heating module 5.

Figure 4A:
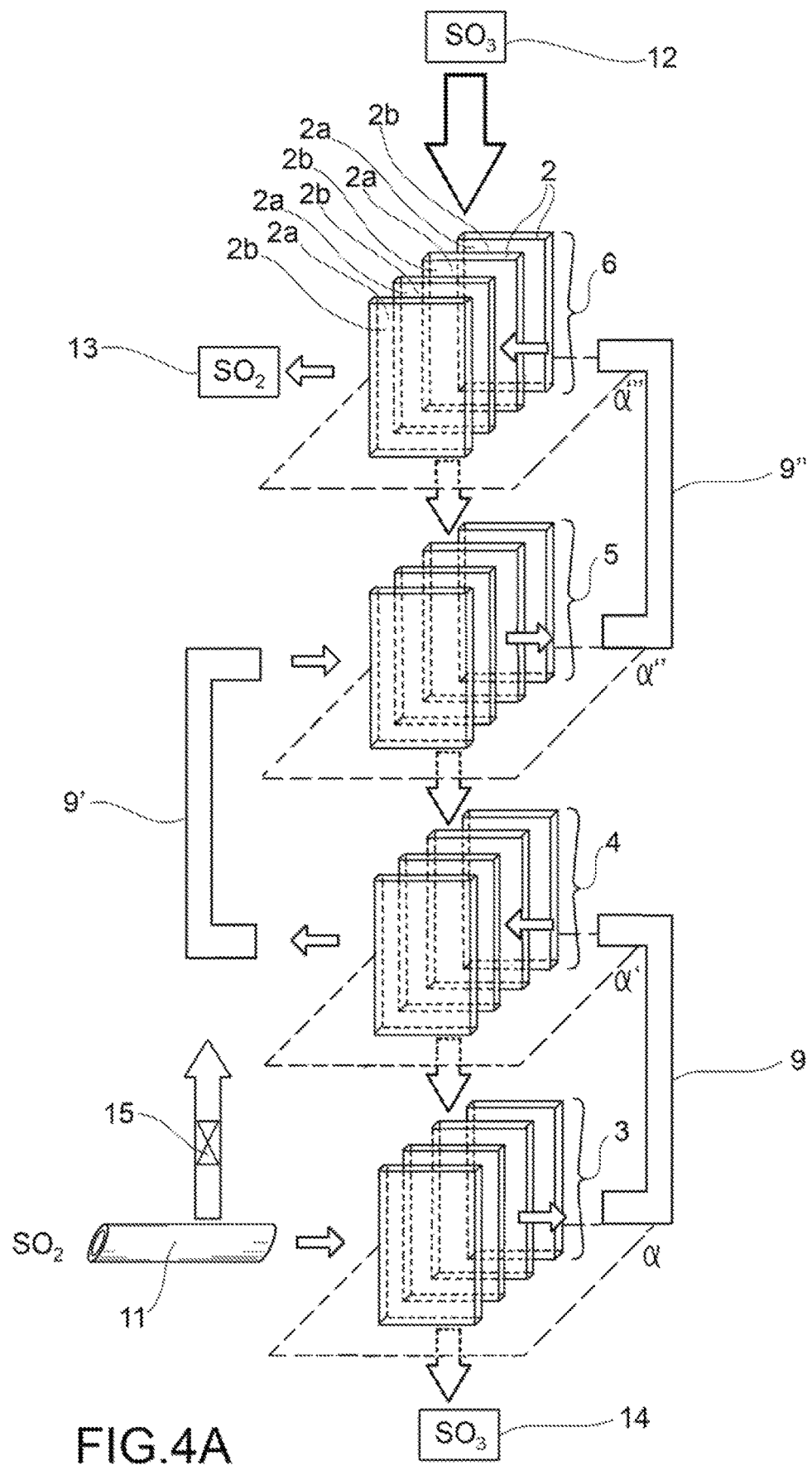
FIG. 4 shows a diagram of the paths of the two flows within the exchanger of the invention provided with bypass at the third module 4A and at the second module (B) 4B.

This configuration of the exchanger 1 is for example depicted in FIG. 4A, in which that system (bypass system) is generally indicated by reference numeral 15.

The bypass 15 is thus able to reduce the flow rate of sulfur dioxide to the first heating module 3.

In particular, the bypass 15 can be obtained by means of partitions or shutters, which may be provided with an external actuator (not shown), capable of modifying the flow rate of sulfur dioxide to the first module 3 or, according to a preferred aspect of the invention, in favor of the third module 5 of the exchanger.

This embodiment has the advantage of allowing the reduction or even the elimination of the heat exchange within the first module 3, thus maintaining constant the temperature of the sulfur trioxide.

Use of the bypass 15 is especially advantageous in conditions of low load of sulfur trioxide (when the flow rate is reduced to 30% of the steady state flow rate), in which in the cold region of the exchanger 1, represented in particular by the last cooling module 3, the temperature of the gas can reach temperatures approaching the dew point.

These conditions can determine a marked increase in the risk of corrosion in the last cooling module, and thus of the condensing section of the SNOX/WSA system.

Advantageously, moreover, it is possible to avoid the electric tracking of the conduits for the exit of the sulfur dioxide, i.e. the heating of the walls of the conduits by means of electrical resistors, because there are no cold points capable of causing the condensation of the sulfuric acid.

In a preferred embodiment of the heat exchanger 1 of the invention, this is situated downstream relative to an electro filter, which is able to reduce the concentration of dusts to a value<2 mg/Nm$^3$.

Figure 1:
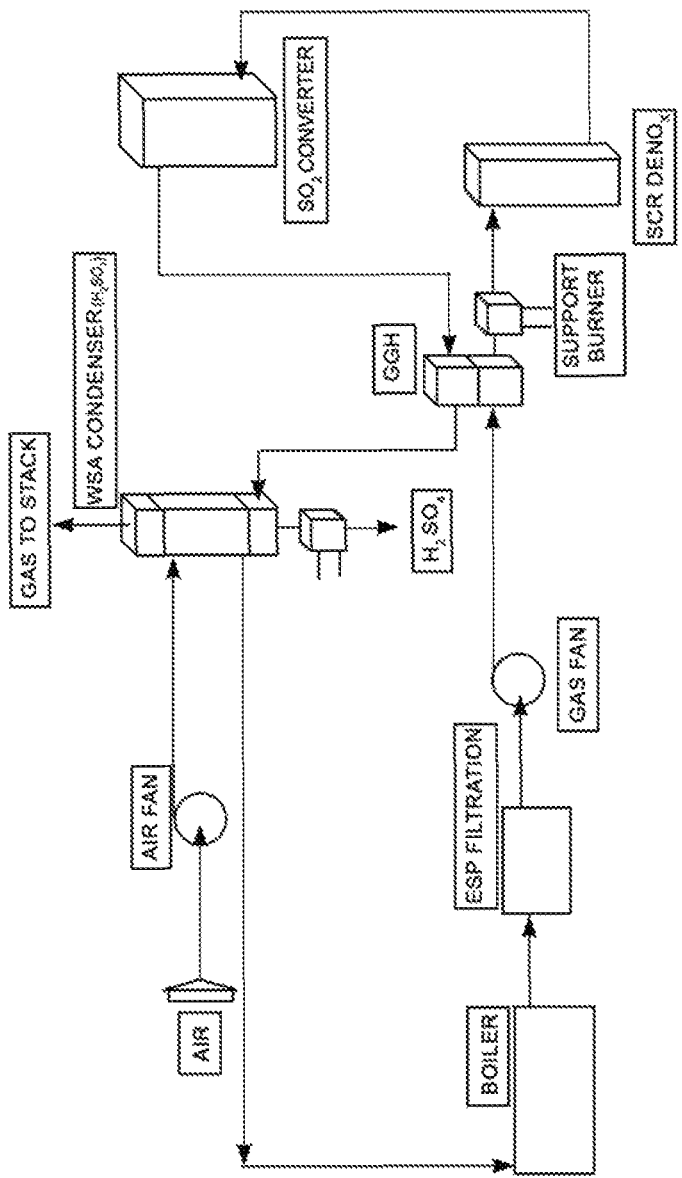
FIG. 1 shows the diagram of a traditional SNOX/WSA system.

In particular, this electro filter is positioned along the conduits 11 which convey the sulfur dioxide into the first module 3 (see FIG. 1).

Figure 5:
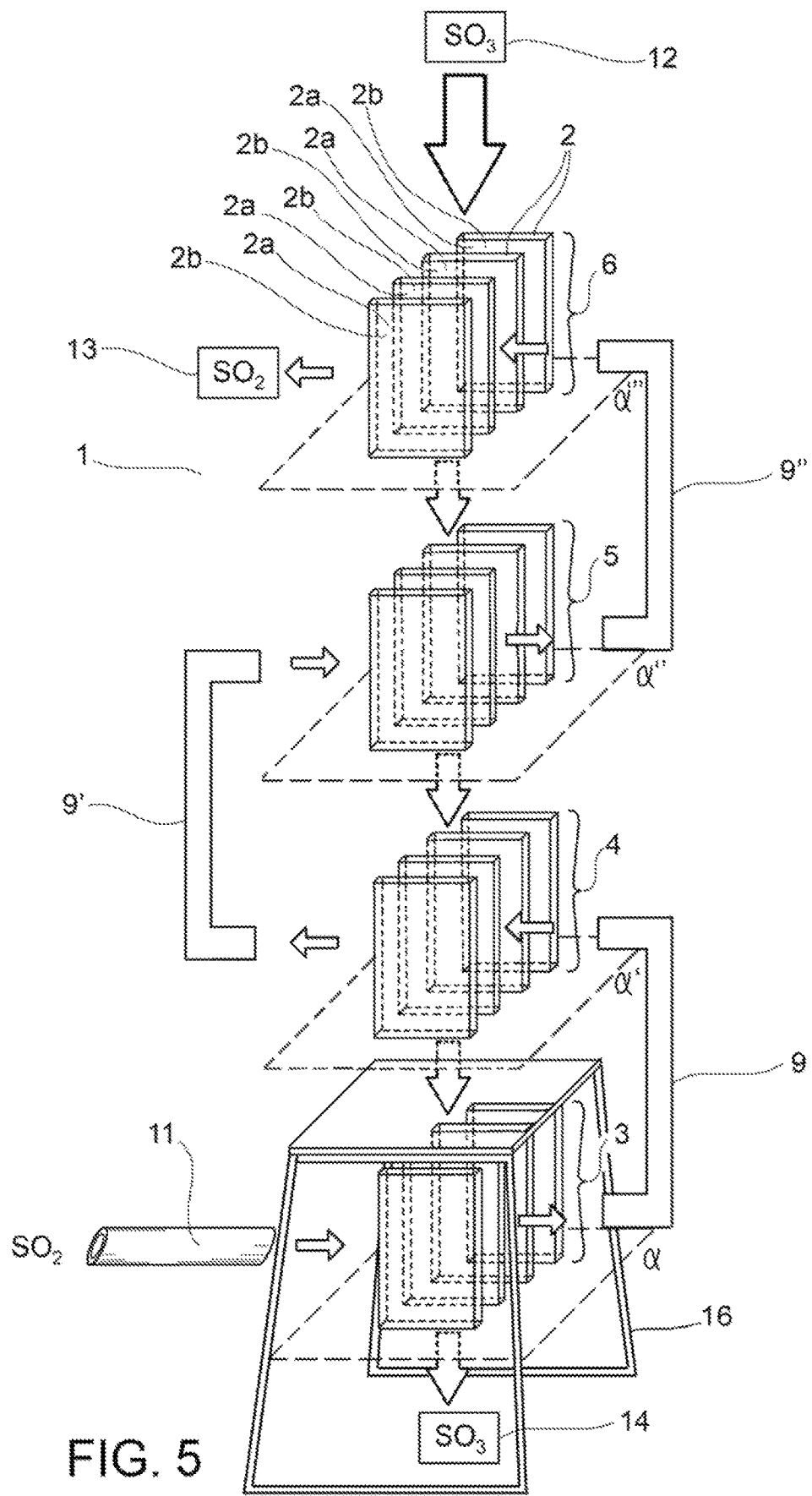
FIG. 5 shows an embodiment of the exchanger of the invention comprising a frame.

According to an embodiment of the present invention, the exchanger 1 of the invention further comprises a support structure (see FIG. 5).

This structure is preferably represented by a frame 16 comprising a load-bearing support structure fastened to the ground for engaging and suspending the lower module 3 (which is the first heating module/last cooling module) to said frame.

Moreover, the other upper modules 4,5,6 preferably bear on the frame 16.

This configuration of the exchanger 1 is capable of making the first heating module 3 independent of the overlying modules 4,5,6.

Advantageously, therefore, it is possible to disengage the first module 3 from the frame 16, e.g. to carry out maintenance work thereon if it becomes necessary to replace one or more of its plates 2 because they are corroded, according to far quicker and simpler procedures with respect to an exchanger without the frame.

In accordance with a further object of the present invention, a system 100 is described, comprising two heat exchangers 101,101' according to the above descriptions, integrated with each other.

The embodiment comprising two heat exchangers mainly finds application when the flow rate of the fluids to be processed is higher than 500,000 Nm$^3$.

Figure 6:
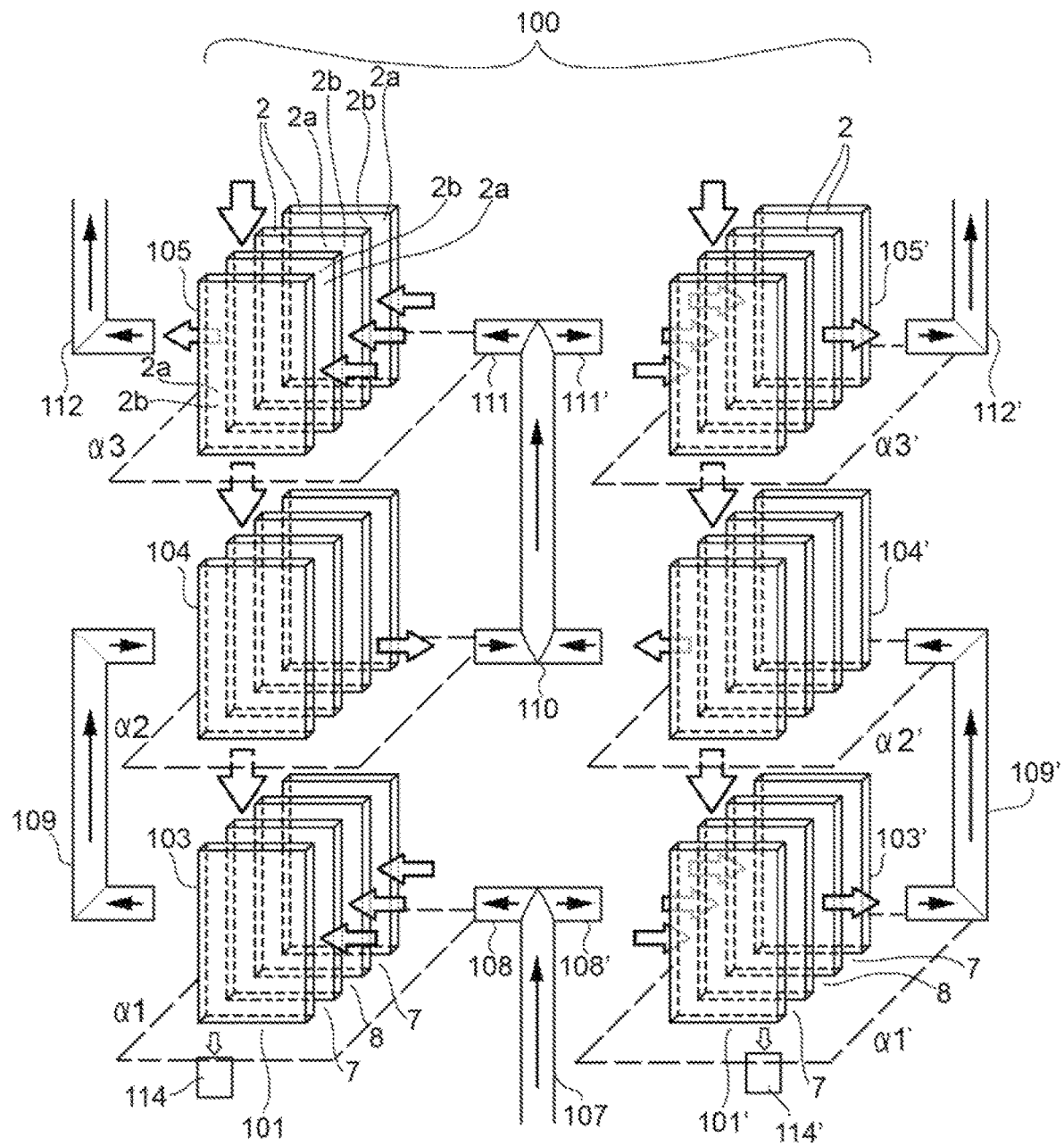
FIG. 6 is a diagrammatic depiction of the system of the invention comprising two integrated exchangers.

This system is depicted in FIG. 6, for example.

In particular, in the described system 100, each exchanger 101,101' comprises first 103,103', second 103,104', third 105,105' and possibly also fourth modules 106,106' (FIG. 6 depicts the diagram of a heat exchanger with three modules).

The sulfur dioxide enters each of the first modules 103, 103' through an appropriate shared conduit 107 which conveys the sulfur dioxide from the fume gases of the boilers and splits in two secondary conduits 108,108' entering the individual modules 103,103'.

At the exit, the gas is conveyed by means of appropriate conduits/conveyors 109/109' to the respective second modules 104,104'.

At the exit, the sulfur dioxide is collected and conveyed to the third heating modules 105,105' by means of an appropriate shared conduit/conveyor 110 which splits in two secondary conduits 111,111'.

The heated sulfur dioxide exits from the third modules 105,105' through distinct conduits/conveyors 112,112' which convey the heated gas to the conversion section of the SNOX/WSA system.

According to the present invention, with appropriate structural modifications, it is also possible to obtain a system of two mutually integrated exchangers, each comprising four modules.

Therefore, similarly to the exchanger 1 described above, the fluid communication between the heating spaces 7 of the modules 103,104,105,103',104',105' is indirect.

Figure 7:
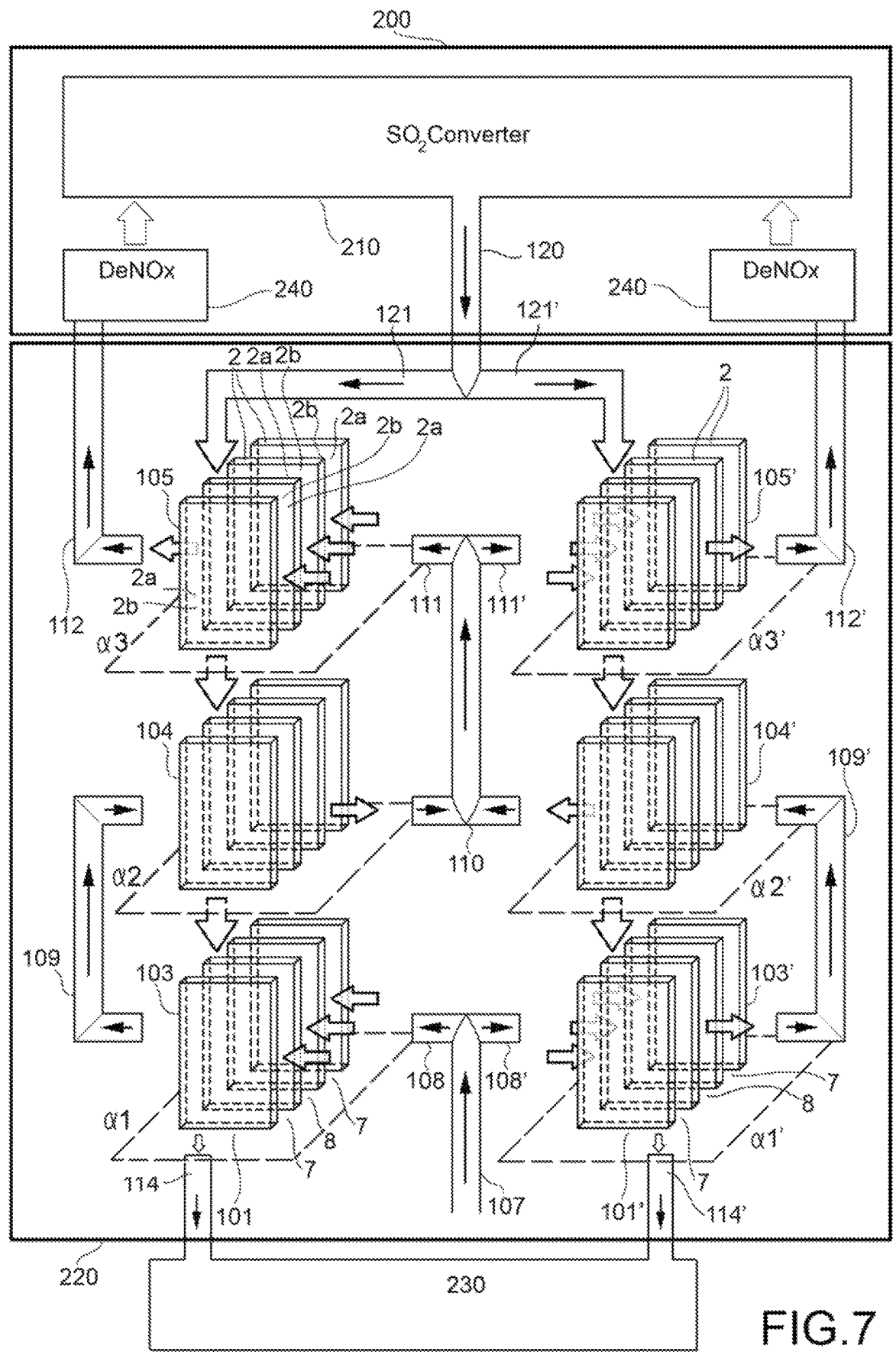
FIG. 7 diagrammatically shows a SNOX/WSA with the system of exchangers of the present invention.

Concerning the sulfur trioxide, it is conveyed into the system through a conduit 120, which branches off in two lateral conduits 121,121', each of which enters the respective third module 105,105' (see FIG. 7).

The sulfur trioxide exiting the third modules 105,105' passes through the successive second modules 104,104' and first modules 103,103' due to the direct fluid connection between the cooling spaces 8, which match between the upper modules and the lower modules.

More in particular, then, the system of the invention 100 comprises two heat exchangers 101,101' in counter-current and cross-flow for heating a first gas and cooling a second gas, each exchanger comprising: a plurality of modules 103,104,105 and 103',104',105' in fluid communication with one another, each module 103,104,105 and 103',104',105' being positioned on a plane $\alpha 1, \alpha 2, \alpha 3$ and $\alpha 1', \alpha 2', \alpha 3'$, respectively, said plane being mutually overlapping, each module 103,104,105 and 103',104',105' comprising a plurality of heat exchange plates 2 each having a heating face 2a and a cooling plate 2b, said plates 2 being positioned orthogonal or sub-orthogonal to the plane of the respective module $\alpha 1, \alpha 2, \alpha 3, \alpha 1', \alpha 2', \alpha 3'$ and being mutually parallel, so as to define heating spaces 7 in which said first gas flows in a direction x (as described above, said direction is substantially parallel to the planes $\alpha 1, \alpha 2, \alpha 3, \alpha 1', \alpha 2', \alpha 3'$ of each module), and cooling spaces 8 in which said second gas flows in a direction y, perpendicular to the direction x (as described above, this direction is substantially orthogonal to the planes $\alpha 1, \alpha 2, \alpha 3, \alpha 1', \alpha 2', \alpha 3'$ of each module), said spaces 7,8 being alternating relative to one another, and each exchanger 101,101' being characterized in that within each of them the cooling spaces 7 of the modules 103,104,105 and 103',104',105', respectively, are in direct fluid communication with one another and in that appropriate conduits/conveyors 109,109',110 place in fluid communication the heating spaces 7 of the first modules 103,103' with those of the second modules 104,104' and the heating spaces 7 of the second modules 104,104' with those of the third modules 105,105', respectively, said system 100 further comprising conduits 107 for the entry of the gas to be heated in the first modules 103,103', conduits 112,112' for the exit of said (heated) gas from the third modules 105,105', conduits for the entry 120 of the gas to be cooled in the third modules 105,105' and conduits 114,114' for the exit of said (cooled) gas from the first modules 103,103'.

Therefore, the integration of the two exchangers 101,101' comprises the use of common conduits 107 for the entry into the system, i.e. into the first modules 103,103', of the gas to be heated, and/or of a common conduit/conveyor 110 which conveys said first gas from the second modules 104,104' and third modules 105,105'.

Moreover, the conduit 120 for the entry of the gas to be cooled in the system of exchangers 100 can be common to the two exchangers 101,101'.

The cooled gas and the heated gas, instead, exit from each exchanger 101,101' by means of independent, non-common conduits 112,112' and 114,114'.

Figure 8A:
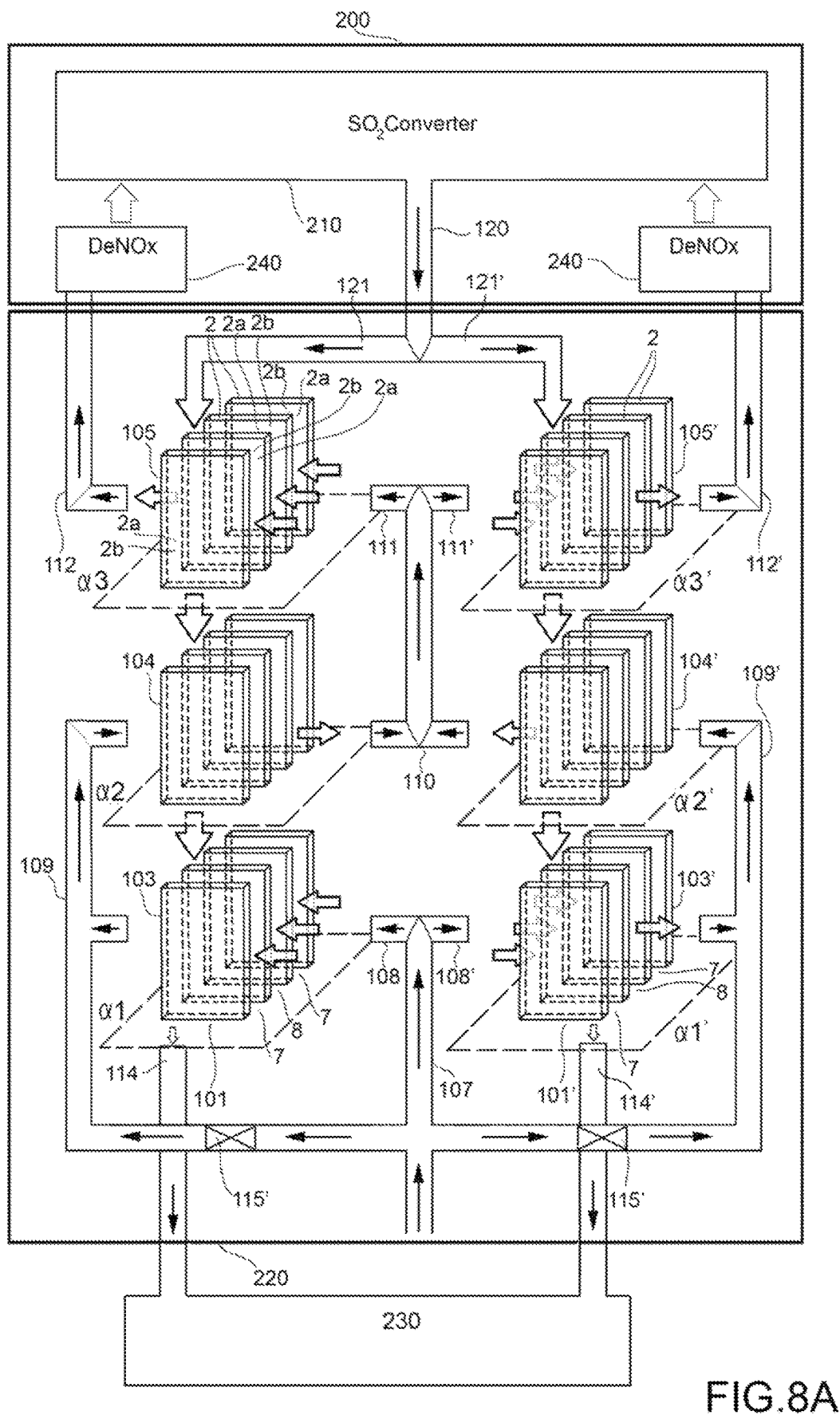
FIG. 8 is a diagrammatic depiction of the system of the invention in which the system of integrated exchangers comprises the by-pass system of the first module 8A and of the second module (B) 8B.
Figure 8B:
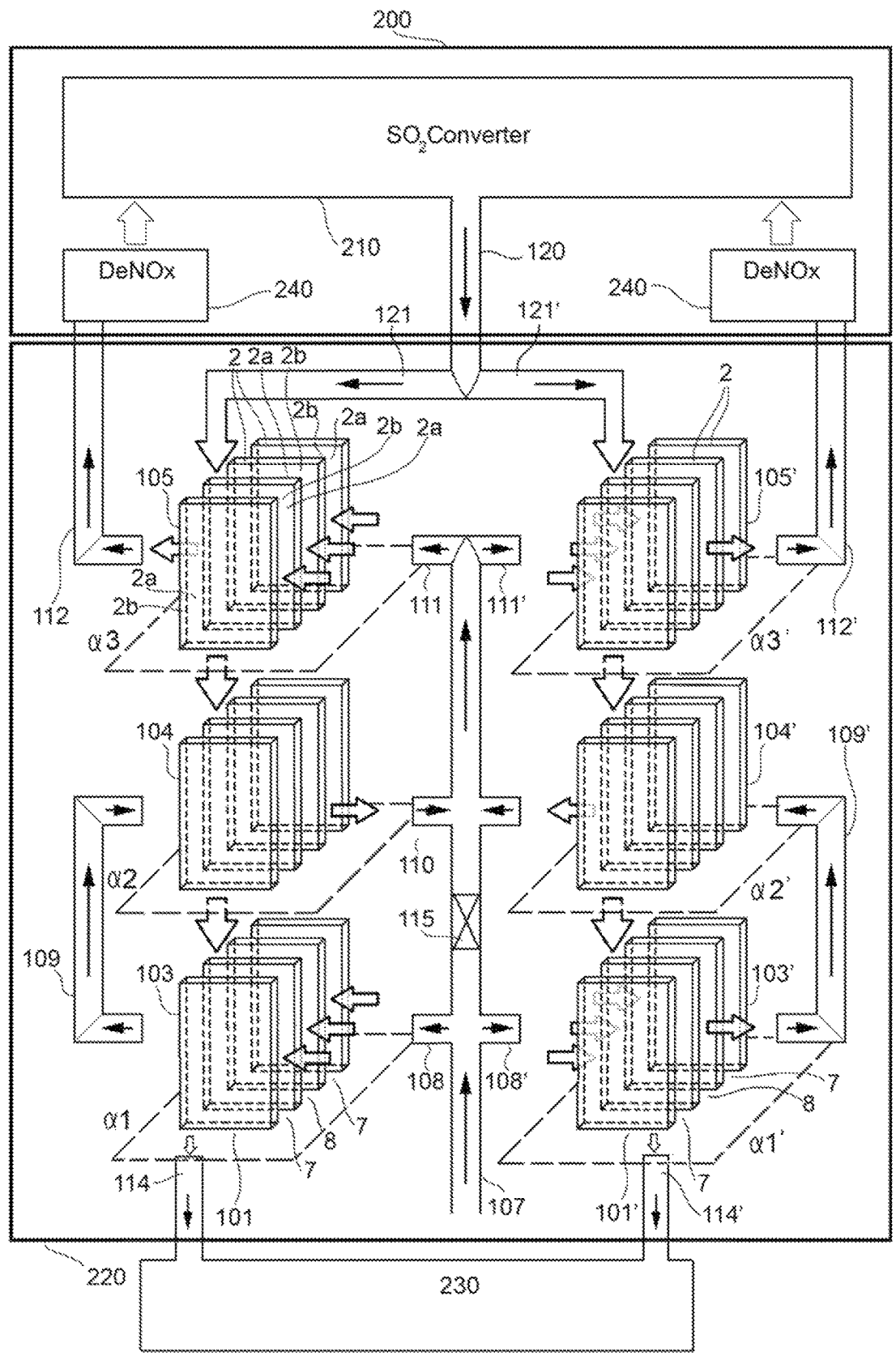

The above-described system 100 comprising two mutually integrated exchangers 101,101' can also comprise a system for reducing the flow of sulfur dioxide to the first modules 103,103' an/or for deflecting at least one portion of said flow to a successive (overlapping) module: the second module 104,104' (FIG. 8A) or the third module 104,105' (FIG. 8B).

This bypass system 115,115' can be obtained by means of partitions or shutters, which may be provided with an external actuator (not shown) according to the above description.

Figure 9:
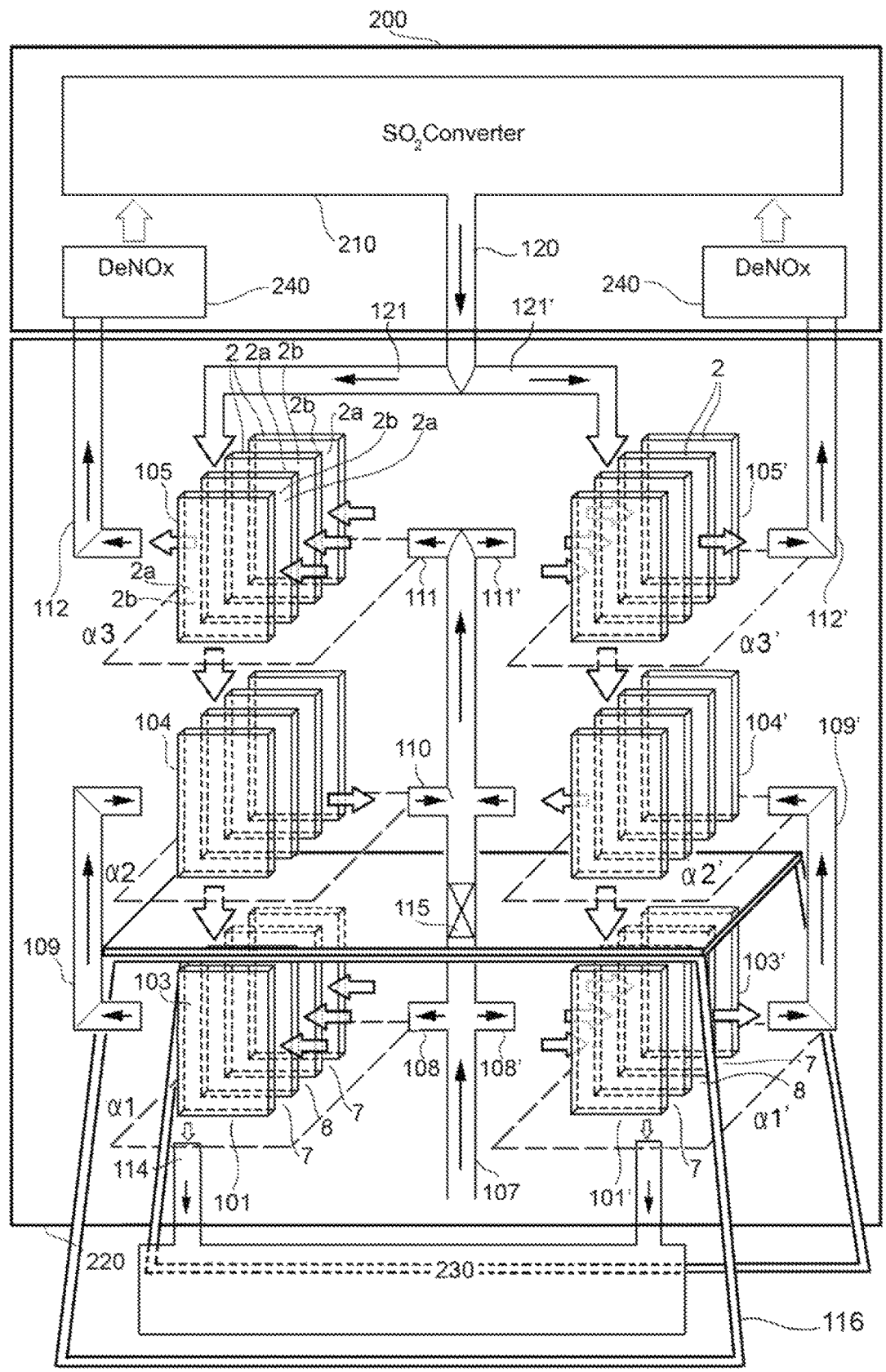
FIG. 9 depicts the system of the invention, in which the exchanger comprises the support frame.
Figure 10:
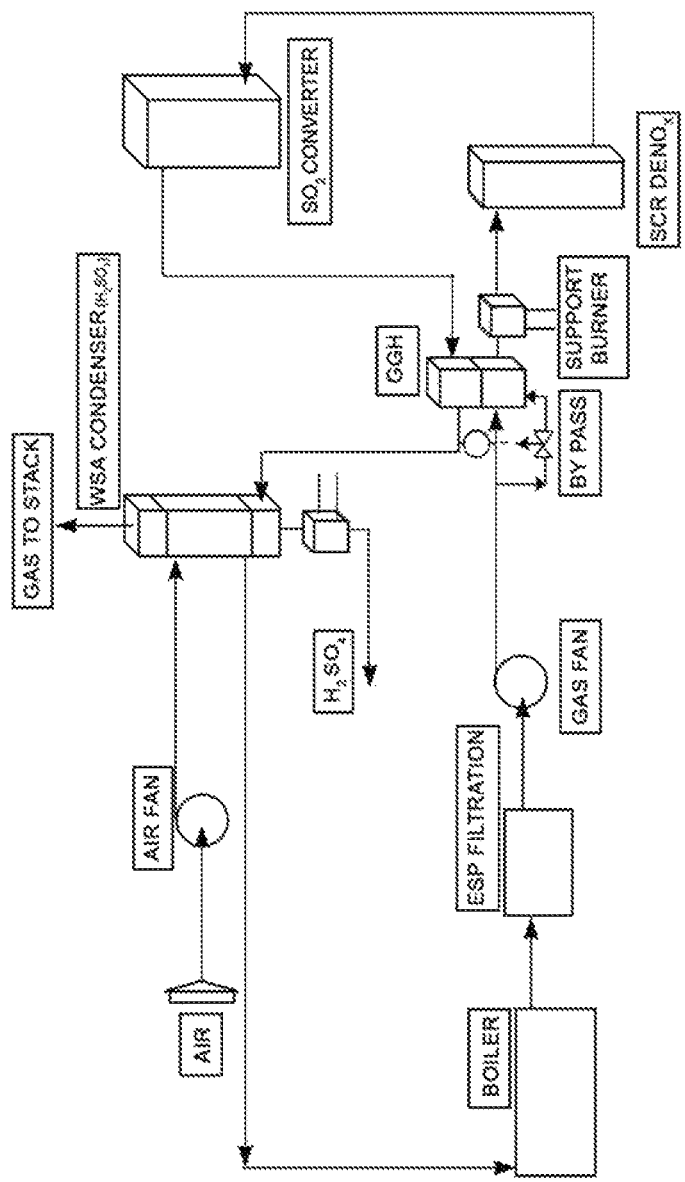
FIG. 10 diagrammatically shows a system according to the present invention.

The integrated system of exchangers 100 can also comprise a structure, for example in the form of a frame 116, comprising elements for the engagement of the first modules 103,103' to said frame 116 (as depicted in FIG. 9).

Due to the independent configuration of the first module 103,103', maintenance of the system is facilitated, to this end the dismounting of said module 103,103' and replacement thereof without needing to remove the remaining modules 104,104',105,105',106,106' being easier.

In a preferred aspect of the invention, in the double configuration as well, the system of heat exchangers 100 can be positioned downstream of an electro filter.

In particular, said electro filter (not shown in the figure) is positioned in the conduit 107 which conveys the sulfur dioxide to enter the first modules 103,103' of the system of heat exchangers of the present invention 100.

The electro filter is advantageously able to reduce the concentration of dusts to a value<2 mg/Nm$^3$.

Due to its utilization, therefore, it is possible to maintain the exchanger cleaner, reducing its maintenance times and costs.

According to a further object, the present invention describes a SNOX/WSA system 200 which comprises:
    a section for the catalytic reaction/conversion of the sulfur dioxide 210,
    a cooling section 220,
    a condensing section 230,
    and possibly one or more sections for the removal of the NOx (DeNOx) 240,
    in which the cooling section 220 comprises the heat exchanger 1 or the system of heat exchangers 100 of the present invention.

In particular, in this system 200 the catalytic reaction section 210 and the DeNOx section(s) 240 are functionally integrated with the heat exchanger 1 or with the system of heat exchangers 100 of the invention.

For this purpose, as shown in FIGS. 8 and 9, the conduit for the exit of the heated sulfur dioxide 112,112' is functionally connected with the catalytic reaction section of the SNOX/WSA system 210.

The term "functionally connected" means that the sulfur dioxide exiting the last heating module 5, 6, 105, 105' is conveyed to the catalytic reaction section 210 of the system 200.

The present invention thus allows to place the sections of the SNOX above the heat exchanger, thus allowing a vertical, rather than horizontal, development of the system 200.

The configuration of the above-described SNOX/WSA system also allows to obtain the exit of the cold flue gases containing sulfur trioxide in the lower part of the system, thus minimizing the conduits which join the exchanger 1,100 and the condensing section 230, and therefore the possible risks of corrosion.

This aspect also contributes to a vertical lay-out, overall more compact than a SNOX/WSA system.

Therefore, the present invention provides a method for carrying out the exchange of heat between a first gas and a second gas using the heat exchanger 1 or the system of exchangers 100 described above.

Preferably, said first gas is represented by the sulfur dioxide ($SO_2$), while said second gas is sulfur trioxide ($SO_3$).

More in general, the method of the invention for heating a first gas and cooling a second gas, comprising the steps of:
    creating a serpentine flow of said first gas from the bottom to the top, said flow comprising horizontal segments alternating with vertical segments, in which said horizontal segments are on overlapping planes;
    creating a vertical flow of said second gas from the top to the bottom vertically, where the vertical flow crosses the horizontal segments of the flow of the first gas,
comprising the step of carrying out the heat exchange between said first and said second gases in the horizontal segments of the serpentine flow of said first gas.

More in particular, said method comprises the step of feeding the exchanger or the system of exchangers 3,4,5,6, 103,104,105,103',104',105' so that said first gas flows through the exchanger from the bottom to the top crossing heating spaces 7 of successive and overlapping modules which are not in mutual direct fluid connection and so that said second gas flows through the exchanger from the top to the bottom crossing cooling spaces 8 of successive and underlying modules which are in mutual direct fluid connection.

In particular, within each module said first gas crosses each heating space 7 according to a direction x (defined as above) and said second gas crosses each cooling space 8 according to a direction y (defined as above), perpendicular to said direction x, thereby achieving a crossed and counter-current flow and a heat exchange between said first and second gases.

Therefore, as depicted in the figures, the first gas enters the first module of the exchanger (3,103,103'), then passes into the second module (4,104,104'), into the third module (5,105,105') and possibly into the fourth module (6); on the contrary, the second gas enters into the fourth module (if present) (6) or into the third module (5,105,105'), passes into the second module (4,104,104') and then into the first module (3,103,103').

According to a particular aspect, the method may further comprise a step of filtering the first gas (sulfur dioxide) to reduce the concentration of dusts, preferably to a value<2 mg/Nm$^3$, before the first heat exchange step and, in particular, before the entry into the first module 3,103,103'.

According to another aspect of the invention, the feeding of the first gas can at least partially exclude one of the modules of the exchanger 1 or of the system of exchangers of the invention 100.

Therefore, it is possible that in at least one module 3,4,5,6,103,104,105,103',104',105', the heat exchange between the two gases is only partially accomplished or is not accomplished at all.

Figure 4B:
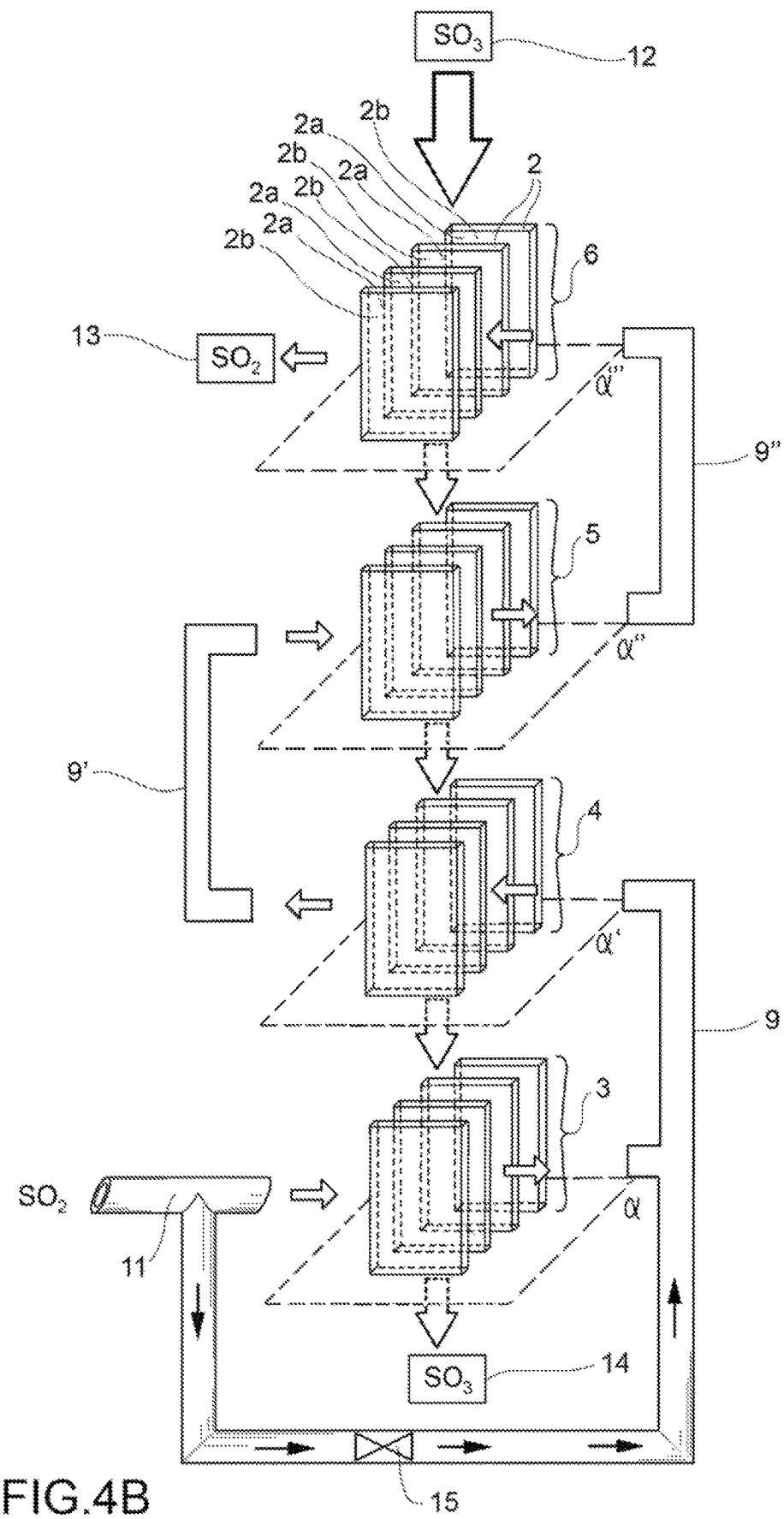

In a preferred aspect of the invention depicted in FIGS. 4 and 8, the first gas can enter the exchanger fully or only partially through the second module (4,104,104'); therefore, the first module (3,103,103') can be partially or fully excluded from the heat exchange.

From the above description, the advantages offered by the exchanger of the invention will be readily apparent to those ordinarily skilled in the art.

Firstly, the contaminations between the two flows of gas are avoided, which allows the SNOX/WSA to maintain its performance around 98%, thus very high.

Moreover, it is possible to change the operating conditions so as to reduce the so-called "dead points" of the gas, which could otherwise cause condensation to sulfuric acid and the consequent progressive corrosion of its plates.

The possibility of introducing a bypass further allows to avoid the lowering of the temperature of the cold region of the exchanger or of the system of exchangers in low load conditions.

In order to avoid the risk of corrosion, the exchange surface was previously reduced producing an increase of the temperature of the sulfur trioxide by about 320-350° C., then reduced by means of a waste heat boiler (WHB), which is able to change the temperature operating a change of the pressure of the product, before entering the condensing section of the SNOX system.

The system according to the present invention is therefore far more flexible, allowing to operate even in low load conditions.

In addition, it is not strictly necessary to trace electrically the exit conduits for the sulfur trioxide.

Therefore, by virtue of the present invention, the presence of the WHB between the section of the heat exchanger and the WSA condensing section is no longer necessary, contributing to a simplification of the system and a reduction of the construction costs.

As a whole, the exchanger is very compact, thus allowing the insertion of the $SO_2$ conversion section and the DeNOX section(s) in the upper area, integrated with the exchanger itself.

Hence, the system has a prevalently vertical development with smaller overall size.

Solutions suggested by the prior art for other application would result, in the case of the exchanger of the present invention, in an increase in the dimensions of the exchanger (in order to increase the heat exchange surface area) not compatible with the requirements and producing, inter alia, a reduction in the LMTD values (the exchanger of the present invention operates with an LMTD of 30° C.)

Lastly, the maintenance of the exchanger, and hence of the SNOX/WSA comprising it, is easier overall, because the modules of the cold region of the exchanger (represented by the last module for cooling the sulfur trioxide) can be supported independently of the upper modules; therefore, they can be dismounted in an easy and independent manner to carry out their maintenance or to replace them in case of corrosion, without the need of working on other parts of the exchanger and/or of the SNOX system.

Moreover, this configuration does not prevent an appropriate expansion of the first module, which, being engaged and suspended to the frame, can expand downwards, freeing the other overlying modules to expand upwards.

The invention claimed is:

1. A counter-current cross-flow heat exchanger for heating a first gas represented by $SO_2$ and cooling a second gas represented by $SO_3$, comprising:

a plurality of modules comprising a first module, a second module and a third module in fluid communication with one another, the first module being positioned on a first plane, the second module being positioned on a second plane, and the third module positioned on a third plane, said planes being mutually overlapping;

conduits for entry of said first gas, conduits for entry of said second gas and conduits for exit of said first gas and conduits for exit of said second gas into and out of the exchanger, each module comprising a plurality of heat exchange plates, each plate having a heating face and a cooling face, said plate being positioned orthogonal to the plane of each module and parallel to one another to define heating spaces between said heating faces, and cooling spaces between said cooling faces, said heating spaces and cooling spaces alternating relative to one another;

a frame, said frame comprising a load-bearing structure resting on the ground and having a supporting portion extending over the first module for engagement and suspension of the first module of the exchanger below the supporting portion of said frame;

wherein said first gas crosses the exchanger from one of the modules to an immediately overlying one of the modules crossing each heating space with a direction substantially parallel to the plane of each module;

wherein said second gas crosses the exchanger from one of the modules to an immediately underlying one of the modules crossing each cooling space with a direction substantially orthogonal to the plane of each module;

wherein the cooling spaces between one of the modules and the immediately underlying module are in direct fluid communication with one another;

wherein the heating spaces between one of the modules and the immediately overlying module are in fluid communication with one another by conduits/conveyors, creating a serpentine path of said second gas.

2. A heat exchanger according to claim 1, comprising three modules or four modules.

3. A heat exchanger according to claim 1, wherein the conduits for the entry of the first gas comprise a bypass system to convey at least one portion of said first gas to a second module or to a third heating module.

4. A SNOX/WSA plant comprising a catalytic reaction section, a cooling section and a condensing section and one or more NOx removal sections, wherein said cooling section comprises a heat exchanger according claim 1.

5. The SNOX/WSA plant according to claim 4, wherein the conduits for entry of the second gas to be cooled are in fluid connection with the catalytic reaction section of the SNOX/WSA system.

6. A method for heating a first gas and cooling a second gas comprising the steps of:

creating a serpentine upwards flow of said first gas, said flow comprising horizontal segments alternating with vertical segments, wherein said horizontal segments are on overlapping planes;

creating a downwards vertical flow of said second gas, carrying out heat exchange between said first and said second gases in the horizontal segments of the flow of said first gas;

which is carried out in a heat exchanger according to claim 1.

7. A method for heating a first gas and cooling a second gas according to comprising the steps of:

creating a serpentine upwards flow of said first gas, said flow comprising horizontal segments alternating with vertical segments, wherein said horizontal segments are on overlapping planes;

creating a downwards vertical flow of said second gas;
carrying out heat exchange between said first and said second gases in the horizontal segments of the flow of said first gas;
carried out in a system according to claim 4.

8. A heat exchanger according to claim 1, wherein a second module of the plurality of modules is above the frame and bears on the frame.

9. A heat exchanger according to claim 1, wherein only the first module is suspended below the support portion of the frame and all other modules of the plurality of modules are above and bear on the frame.

10. A heat exchanger according to claim 1, wherein the first module is spaced apart from the ground.

11. A heat exchanger according to claim 1, wherein the first module is removable independently of other modules of the plurality of modules.

12. A heat exchanger according to claim 1, further comprising a fourth module in fluid communication with the first, second and third modules, the fourth module being positioned on a fourth plane, said fourth plane being mutually overlapping with the first, second a third planes.

\* \* \* \* \*